(12) United States Patent
Breau et al.

(10) Patent No.: US 9,097,234 B2
(45) Date of Patent: Aug. 4, 2015

(54) POWERED APPARATUS FOR FLUID APPLICATIONS

(71) Applicants: Kenneth William Breau, Brantford (CA); Alan Grier Wason, Burlington (CA)

(72) Inventors: Kenneth William Breau, Brantford (CA); Alan Grier Wason, Burlington (CA)

(*) Notice: Subject to any disclaimer, the term of this patent is extended or adjusted under 35 U.S.C. 154(b) by 255 days.

(21) Appl. No.: 13/734,623

(22) Filed: Jan. 4, 2013

(65) Prior Publication Data
US 2013/0175802 A1 Jul. 11, 2013

Related U.S. Application Data

(60) Provisional application No. 61/722,365, filed on Nov. 5, 2012, provisional application No. 61/583,400, filed on Jan. 5, 2012.

(51) Int. Cl.
B05B 1/14 (2006.01)
F03B 13/10 (2006.01)
F03B 13/00 (2006.01)

(52) U.S. Cl.
CPC ............... F03B 13/10 (2013.01); F03B 13/00 (2013.01); F05B 2220/60 (2013.01); Y02B 10/50 (2013.01)

(58) Field of Classification Search
USPC .......................................... 290/54
See application file for complete search history.

(56) References Cited

U.S. PATENT DOCUMENTS

| 3,028,140 | A | * | 4/1962 | Lage | 416/188 |
| 3,845,291 | A | | 10/1974 | Portyrata | |
| 3,913,399 | A | * | 10/1975 | Sheeks | 73/861.86 |
| 4,246,753 | A | * | 1/1981 | Redmond | 60/398 |
| 4,402,094 | A | | 9/1983 | Sanders | |
| 4,564,889 | A | * | 1/1986 | Bolson | 362/192 |
| 4,616,298 | A | | 10/1986 | Bolson | |
| 5,140,254 | A | * | 8/1992 | Katzman | 322/35 |
| 5,228,964 | A | * | 7/1993 | Middleby | 204/194 |

(Continued)

FOREIGN PATENT DOCUMENTS

KR 20110009830 A 1/2011
WO 2009104020 A1 8/2009

OTHER PUBLICATIONS

International Search Report and Written Opinion, Application No. PCT/IB2013/000012 date Sep. 17, 2013.

(Continued)

Primary Examiner — Tho D Ta
(74) Attorney, Agent, or Firm — MacMillan, Sobanski & Todd, LLC

(57) ABSTRACT

A powered apparatus for fluid applications includes a housing dimensioned and configured for mounting in a fluid conduit. The apparatus includes a generator for generating power. The apparatus also includes a power storage device for storing the generated power. The housing, generator and storage device comprise an integrated unit. The apparatus also includes a device connected to be powered by the generated power, for example, LED or OLED lighting. In certain embodiments, the apparatus can be mounted in a fluid conduit of a water feature. In another embodiment, the apparatus includes a microprocessor for controlling at least one of power storage, wireless communication, and monitoring of a parameter associated with the fluid. In another embodiment, the apparatus includes a controller and a power storage device and does not include a generator. The apparatus may further include a docking station for charging the power storage device.

31 Claims, 8 Drawing Sheets

(56) References Cited

U.S. PATENT DOCUMENTS

| | | | |
|---|---|---|---|
| 5,580,438 A * | 12/1996 | Silveri | 205/687 |
| 6,036,333 A * | 3/2000 | Spiller | 362/192 |
| 6,285,868 B1 | 9/2001 | LaDue | |
| 6,375,090 B1 | 4/2002 | Beidokhti | |
| 6,439,472 B1 * | 8/2002 | Lin et al. | 239/18 |
| 6,578,207 B1 | 6/2003 | Fratilla | |
| 6,702,451 B1 | 3/2004 | Daane | |
| 6,800,205 B2 | 10/2004 | Collins | |
| 7,036,951 B2 | 5/2006 | St-Hilaire | |
| 7,357,525 B2 | 4/2008 | Doyle | |
| 7,413,319 B2 | 8/2008 | Longoria et al. | |
| 7,628,512 B2 | 12/2009 | Netzel, Sr. et al. | |
| 7,692,559 B2 | 4/2010 | Face et al. | |
| 7,717,582 B2 | 5/2010 | Longoria et al. | |
| 7,752,893 B2 | 7/2010 | Biberger | |
| 7,779,852 B2 | 8/2010 | Burlage et al. | |
| 7,818,826 B2 | 10/2010 | Schmidt et al. | |
| 7,831,353 B1 | 11/2010 | Barron et al. | |
| 7,841,732 B2 | 11/2010 | Coushaine et al. | |
| 8,092,675 B2 | 1/2012 | Kennedy | |
| 8,319,434 B2 | 11/2012 | Hente | |
| 8,618,687 B2 * | 12/2013 | Burnham | 290/54 |
| 8,649,908 B2 | 2/2014 | Nibler et al. | |
| 2002/0035403 A1 | 3/2002 | Clark et al. | |
| 2003/0147238 A1 | 8/2003 | Allen et al. | |
| 2003/0227394 A1 | 12/2003 | Rothgeb et al. | |
| 2006/0223394 A1 | 10/2006 | Porat | |
| 2007/0251461 A1 | 11/2007 | Reichard et al. | |
| 2008/0021685 A1 | 1/2008 | Emery et al. | |
| 2008/0039977 A1 | 2/2008 | Clark et al. | |
| 2008/0258907 A1 | 10/2008 | Kalpaxis | |
| 2008/0311898 A1 | 12/2008 | Benco et al. | |
| 2010/0250449 A1 | 9/2010 | Doyle et al. | |
| 2011/0012356 A1 | 1/2011 | Burnham | |
| 2012/0110727 A1 | 5/2012 | Uy et al. | |
| 2012/0249333 A1 | 10/2012 | Kunis | |
| 2012/0302228 A1 | 11/2012 | Gray | |
| 2014/0266788 A1 | 9/2014 | Bauckman et al. | |
| 2014/0292535 A1 | 10/2014 | Petite et al. | |
| 2014/0303757 A1 | 10/2014 | Pruchniewski et al. | |
| 2014/0303810 A1 | 10/2014 | van der Meijden et al. | |

OTHER PUBLICATIONS

"Agency Reviews Patent Application Approval Request for 'System and Method for Monitoring Ph or Other Chemical Activity in a Pool'", Telecommunications Weekly, 2012, p. 1.

Professor ePool: "Now Your Pool Can Talk", Great American Merchandise & Events, 2010, web article, p. 1.

"ePool Owner's Manual" Model 4817 & 4819, Great American Merchandise & Events, 2010, pp. 1-28.

"ePool Smart System", Great American Merchandise & Events, 2015, web article, p. 1-2.

Sutro Smart Water Monitor "Solving Chemistry in One Device", Sutro, 2013, web article, pp. 1-7.

* cited by examiner

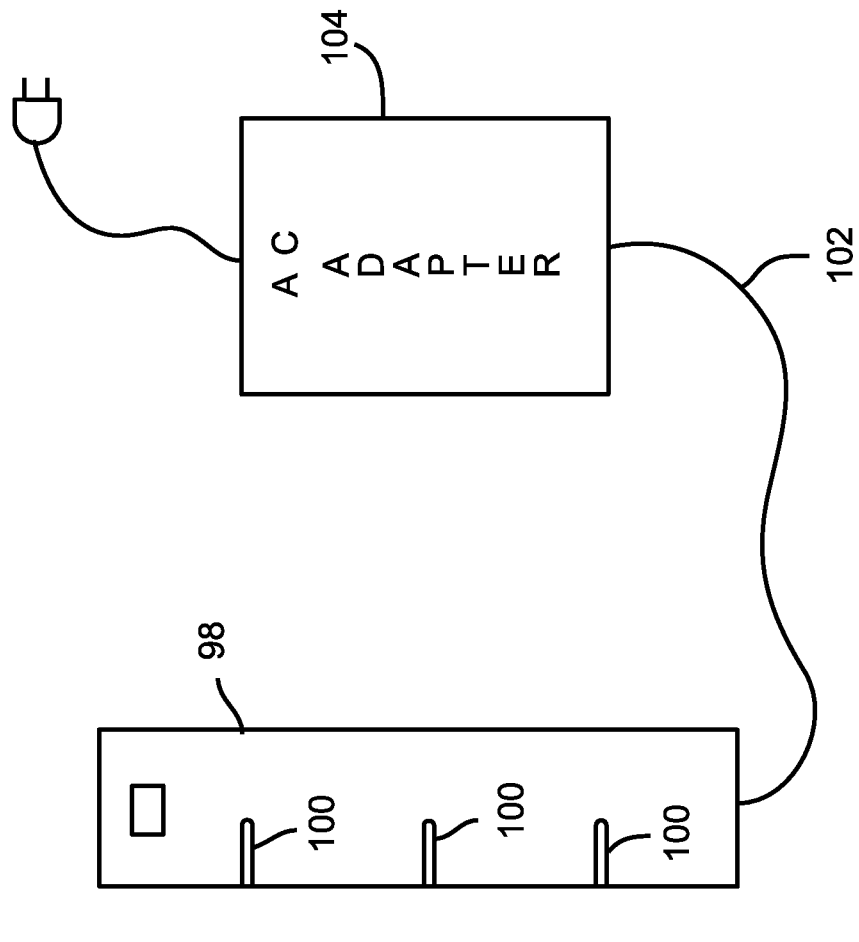
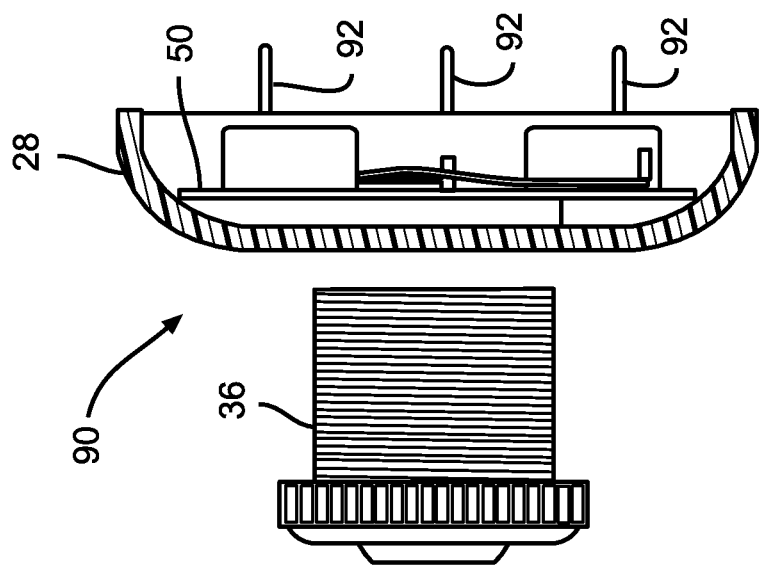
FIG. 8

POWERED APPARATUS FOR FLUID APPLICATIONS

CROSS-REFERENCE TO RELATED APPLICATIONS

This application claims the benefit of U.S. Provisional Application No. 61/583,400, filed Jan. 5, 2012, and of U.S. Provisional Application No. 61/722,365, filed Nov. 5, 2012, the disclosures of which are incorporated herein by reference.

BACKGROUND OF THE INVENTION

This invention relates in general to powered apparatuses for fluid applications, and in particular to powered apparatuses for applications such as water features, irrigation systems, plumbing systems and others.

It is common to include water features on properties for recreational or decorative purposes. For example, pools, spas and hot tubs are very popular for recreation and entertainment. Landscapers often use water features such as fountains, pools, ponds, cascades, waterfalls or streams to improve the decorative or aesthetic aspects of properties.

The water features often include powered devices for improving their appearance or usefulness, or related to their operation. For example, the devices may relate to illumination, monitoring, testing or control of the water features. The inclusion of lighting can both improve the appearance of the water features and extend their useful operating period into the evening hours. Water features often include equipment or complete automation systems for testing, monitoring and/or controlling aspects such as water quality, flow, level, filtration, pumping, and/or the addition of chemicals.

Current powered devices or their alternatives for water features come with some drawbacks. Typically water feature illumination devices are manufactured and sold in a form that requires an external electrical power source with very expensive purchasing/installation costs. Water testing and monitoring has been a problem requiring either inconvenient/inaccurate test strips or very expensive instrumentation meters. Other types of equipment for testing, monitoring and/or control are expensive to purchase and install and require an external source of power.

It would be desirable to provide an improved powered apparatus for fluid applications such as water features and others that can overcome some of the drawbacks associated with current devices.

SUMMARY OF THE INVENTION

This invention relates to a powered apparatus for fluid applications. The apparatus includes a housing dimensioned and configured for mounting in a fluid conduit. The apparatus includes a generator for generating power. The apparatus also includes a power storage device for storing the generated power. The housing, generator and storage device comprise an integrated unit. The apparatus also includes a device connected to be powered by the generated power, for example, LED or OLED lighting. In certain embodiments, the apparatus can be mounted in a fluid conduit of a water feature.

In another embodiment, the powered apparatus includes a controller, such as a microprocessor, for controlling power storage, wireless communication, and/or monitoring of a parameter associated with the fluid. For example, the microprocessor may control the quantity or timing of power storage in a battery. In certain embodiments, the microprocessor controls a wireless device for exchanging data. In certain embodiments, the microprocessor controls a monitoring device for monitoring a property of the fluid, such as chemical or microbial content, temperature, and/or flow rate.

In another embodiment, the powered apparatus includes a controller and a power storage device and does not include a generator. The apparatus may further include a docking station for charging the power storage device.

Various aspects of this invention will become apparent to those skilled in the art from the following detailed description of the preferred embodiment, when read in light of the accompanying drawings.

BRIEF DESCRIPTION OF THE DRAWINGS

FIG. 8 is an exploded view, partly in cross-section, of a removable front assembly of the apparatus of FIG. 7 having docking pins in position for docking with a charging and data transfer unit of a charging assembly.

DETAILED DESCRIPTION OF THE PREFERRED EMBODIMENT

Figure 1:
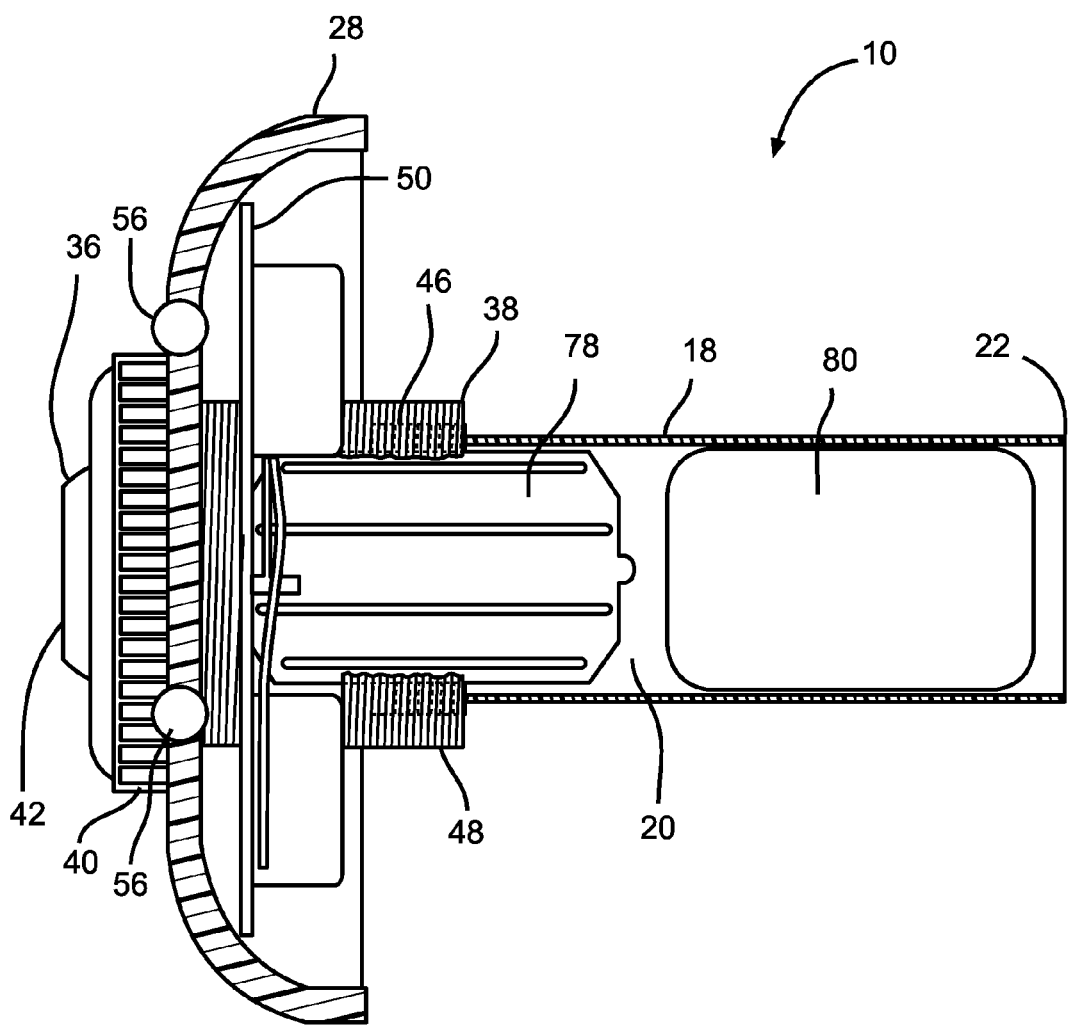
FIG. 1 is a side elevational view, partly in cross-section, of an assembled apparatus according to the invention.

For the purposes of promoting an understanding of the principles of the invention, reference will now be made to preferred embodiments and specific language will be used to describe the same. It will nevertheless be understood that no limitation of the scope of the invention is thereby intended, such alterations and further modifications in the described apparatus, and such further applications of the principles of the invention as illustrated therein being contemplated as would normally occur to one skilled in the art to which the invention relates.

The present invention relates to a powered apparatus for a fluid application. The fluid application can be any application in which fluid flows through a conduit, by which is meant any channel, pipe, tube, line, opening, orifice, or the like through which fluid flows. For example, the fluid application can be any commercial, household (residential), industrial or public fluid application. The fluid can be practically any type of fluid; in certain embodiments, the fluid is water or other non-volatile fluid.

The fluid can be caused to flow through the conduit by returning or drawing in of fluid flow, for example by pushing or pulling the fluid by pump or gravity, or any other force that causes it to flow.

In certain embodiments, the fluid conduit is part of a water feature. The term "water feature", as used herein, includes pools, spas, hot tubs, and other water features used to improve the aesthetics of properties, such as fountains, ponds, etc. For example, in certain embodiments, the fluid conduit is associated with a water filtration system. This may be a conduit through which water is drawn from the water feature by a pump and flows through a filter. It may also be a return conduit through which water is returned to the water feature after it has been filtered. As another example, the fluid conduit may be associated with a skimmer drawing/suction of a water feature.

More generally, the fluid conduit can be any suction line (where fluid is drawn in) or return line (where fluid is flowed out) of any fluid application. For example, this can include new or existing or retrofit floor nozzles, such as in-floor cleaning pop-up (fixed and/or rotating) floor nozzles, and it can also include new or existing or retrofit drain fittings (such as main drains), covers and sumps. The apparatus may be adaptable to all industry return fittings.

In certain embodiments, the powered apparatus of the invention is dimensioned and configured for mounting as a fixture in a fluid conduit, or it can be modified for this use. The fixture may be permanent/removable or retrofitable. For example, in certain embodiments the apparatus can be a return fitting in a return conduit/line of a water feature.

In other embodiments, the apparatus may be used or modified to be used in any commercial, household (residential), industrial or public irrigation system. In further embodiments, the apparatus may be used or modified to be used in any commercial, household (residential), industrial or public plumbing application where water or other fluid is discharged through or drawn through a conduit. For example, it may be used as a fixture in a plumbing application. A large number of other current or future applications are also envisioned.

Some nonlimiting examples of applications in which the apparatus may be used include the following. Automated pool, spa, and water feature—industrial, commercial or residential system cleaners such as Kreepy Krauly® or Robotic®. Automated pool cleaners are described at http://en.wikipedia.org/wiki/Automated pool cleaner. In-floor cleaning systems such as described at http://www.infloorpoolparts.com. The apparatus may be useful in practically all aspects of an automated in-floor cleaning system such as: main drain sumps, debris removal types or other (field fabricated or pre-manufactured), in-floor nozzles for floor cleaning (rotating, fixed, retrofit or new retractable/extendable nozzles).

Some nonlimiting examples of types of return jets include side jets, bottom jets, and stair jets. Some nonlimiting examples of accessory components include sheer descent waterfalls, deck jets, slides, venturi or standard skimmers (small or wide mouth housings), laminar jets, debris collection devices/housings and diving boards. The apparatus may also be useful with jets or components not currently on the market.

The apparatus may be combined with another application. For example, it may be combined with a pool cleaning or circulation system in the suction or supply side of the system. It may include lighting, monitoring (e.g., flow rates), or other devices/functions.

The powered apparatus includes a housing dimensioned and configured for mounting in a fluid conduit. The housing is described in more detail below in relation to the embodiments shown in the drawings.

In certain embodiments, the housing defines a fluid flow path through the housing, and the apparatus includes a generator attached inside the fluid flow path for generating power from the fluid. In certain embodiments, the generator functions by generating power as a result of fluid flow. For example, the generator may work by converting the kinetic energy of the fluid flow to electrical energy. For example, the generator may convert the energy mechanically by the use of a rotor, turbine, paddle, paddle wheel or other water wheel, venturi generator, or the like. In certain embodiments, the generator transforms the energy of flowing fluid into rotational energy, which is converted into electricity.

Alternatively, the generator may generate power by any other means and not necessarily as a result of fluid flow or from the fluid. For example, the generator may generate power chemically with the use of any type of chemical generator, or it may generate power with a bi-metal generator. The generator may use one or more magnets such as rare earth magnets. There are currently other theories that energy can be extracted from water in other forms. See, for example, the information at the following internet links: http://www.lenntech.com/water-energy-faq.htm, and http://www.eia.gov/kids/energy.cfm?page=hydropower_home-basics-k.cfm. The generator may function by another technology currently known or conceived in the future; it is anticipated that as technology changes so may the method of generating power.

In certain embodiments, the generator may be referred to as a microgenerator. For example, microhydropower systems are described in more detail at the following internet link: http://energy.gov/energysaver/articles/microhydropower-systems. The power range of the generator will be governed by the load demand from the device and it can vary over a large range.

In certain embodiments, the powered apparatus includes a power storage device for storing the power produced by the generator, or storing power from another source, for example when the apparatus does not include a generator. The apparatus may include a single device or multiple devices. The storage device may be rechargeable. For example, in certain embodiments, the storage device is one or more rechargeable batteries. Any suitable type of rechargeable battery can be used, for example, nickel-zinc batteries. Another example of batteries are flat batteries available from a company called IPS (Infinite Power Solutions) http://www.infinitepowersolutions.com/. In certain embodiments, the apparatus is powered by disposable batteries. In certain embodiments, the battery or other storage device has a life span of 1 to 10 years depending on the number of charges and type of material it is constructed from. The storage capacity of the battery or other storage device may vary depending on the size of the apparatus and other factors.

It is anticipated that the storage device may change as new technology is developed for power storage in the future. For example, this device may evolve as technology changes and more efficient systems of electrical storage are developed.

In certain embodiments, the apparatus may include a charging pad, docking station or other charging device for recharging a rechargeable battery or other storage device of the apparatus, similar to a docking station used for recharging a cell phone. The charging device and the housing of the apparatus may be dimensioned and configured to be positioned together for the charging. The charging device and the apparatus may have cooperating power connection structures for transferring power from the device to the apparatus. The charging device may be included in addition to the generator, or it may be used with an embodiment of the apparatus that does not include a generator.

For example, the apparatus may include an induction charging system. The apparatus may be removed from the location where it is installed and placed on a charging pad or other charging device, similar to those used with smart phones, electric toothbrushes, and other electronic devices. Alternatively, a pre-charged transfer unit may be connected or placed next to the apparatus while it is still installed to recharge the apparatus. A charging station may be a charging mat or other suitable device. The charging station may be equipped for data transfer to and from the apparatus as well as charging the apparatus. As technology evolves the charging device may also evolve. Induction charging is described at http://en.wikipedia.org/wiki/Inductive_charging and http://www.explainthatstuff.com/inductionchargers.html.

In certain embodiments, the apparatus may include a "push and lock" system. This system may include a faceplate of the apparatus holding batteries and electronics. A component housing of the apparatus may remain installed in the fluid conduit while the faceplate is removable by the push and lock system. This would allow easy removal of the faceplate or in-line component housing so that it may be placed on an inductive charger/data transfer or docking station, and then reattached to the component housing after the charging/data transfer.

The apparatus also includes one or more devices connected to be powered. The device(s) may be part of the integrated unit of the apparatus, or they may be separate from the integrated unit but connected in any suitable manner to be powered by the apparatus.

In certain embodiments, the powered device includes lighting/illumination. For example, the lighting may be LED (light-emitting diode), OLED (organic light-emitting diode), hybrid lighting, fiber optic, or any other type of lighting, which may include a type of lighting developed in the future. As technology changes and other forms of illumination become available this product will evolve. In the past, water illumination has been a problem requiring an external source of electricity and expensive installation/purchasing costs; the apparatus of the invention can be a cost-effective alternative that is easy to retro-fit in any water environment. When used in a water feature, the apparatus can illuminate the water and illuminate or accent the area in which it is placed.

The lighting of the apparatus may provide multiple levels and colors of illumination. The lighting may be fixed color direct light or fixed color indirect light. The apparatus may include snap-on color covers to change the desired look to multi-colored lights or aesthetics (look) of the cover of the face plate. In certain embodiments, the apparatus may be able to monitor water quality, integrate with an automation system, and/or have an intelligent device interface so that the user is able to dim the lights to a desired level, change the color of the lights and even create a lighting sequence with a tethering program between devices for custom sequences in an area, and program parameters related to the functionality of a chemically balanced body of water. In certain embodiments, the illumination can create an intrusion visual alert system to coincide with the connection to the intelligent interface and/or notify the user that the water has strayed outside pre-programmed set points.

The apparatus may have a variety of operational options available, including but not limited to: static ring of lights with a simple on/off operation controlled by a photo cell, indirect lights to give the presence of a glow ring, radio/Bluetooth®/wireless communication to various user selectable functions such as time of day operation, pattern of light display, or tethering of other lights to create a sequence of operations. Photo cell activation may vary depending on the apparatus and the requirements of the application.

As described in more detail below, in certain embodiments the apparatus includes a controller such as a microprocessor. The controller may have a number of functions related to the lighting. For example, the controller may receive and process signals from a photo cell detector for activation of the illumination system; and it may function in the conversion, regulation and/or distribution of electrical signals to the illumination circuit to control the duration, intensity, color and/or pattern of the illumination system.

In a certain nonlimiting example, the controller can monitor ambient light levels so that a hard switch (term used to define and prevent light flutter) on or off will require a minimum of 5 minutes at 0.8±1.0 ftc and turn off 1.5 times greater than the turn on light level. These numbers may vary depending on the apparatus and the particular application. The controller may also control the color, intensity and possible cycling the different colors of the light. This may be model dependent if equipped with the option to have different light patterns and intensity levels.

The apparatus may enable the user to control the hours of operation (overriding the photo cell), light levels, light color and/or light pattern. The user could activate a security mode which would activate high intensity flash circuit in the controller to the lighting system and possibly a high level tone generator (alarm). This could be used to startle the intruders and send a signal back to the user's alarm system that alerts them about the intrusion of the pool or water feature.

The apparatus may also include one or more attachments to enhance the operation or for other purposes. For example, the attachment could be in the form of an additional LED or OLED ring or fiber optic strands that can be placed around the edge of the water feature in the coping bead area or other areas. A water feature such as a fountain could include fiber optic features powered by the apparatus. Attachments may create an illuminated fountain effect and/or illuminate other features such as coping around the pool or other water feature edge.

The user may be able to tether the apparatus to other apparatuses, for example, to other return jets in a water feature, for light sequence programming or other desired effect. Attachments may include, but are not limited to, fiber optic interface connections such as water features (fountains), attachments for accenting the coping lining of the water feature, and fiber optic fountains and/or tracer lines to be installed in water features. There are a number of fiber optic accessories that could be used with the lighting system of the apparatus.

The apparatus may include a clip-on electrical connector that may be used for other ancillary devices such as coping lighting, wireless speakers, or fountain lighting such as light streams. More information about these devices can be found at http://www.royalswimmingpools.com/Perimeter-Fiber-optic.htm, http://www.inyopools.com/fiber_optics_perimeter.aspx, http://outdoorspeakerstore.com/Wireless_outdoor_Speakers_orderby0_page_1_c_253.html, http://www.inyopools.com/Products/01900015042784.htm, and http://www.soundcastsystems.com/.

In certain embodiments, the apparatus includes a controller such as a microprocessor. This controller is the intelligent component of the apparatus and may control one or more of the following functions associated with the apparatus: monitor and control power generation, regulate energy stored, activate an illumination system, control water quality probes, and in some units communicate with other intelligent devices for greater user control. In some models the controller can also be set up to monitor intrusion and go into alarm mode activating an individual unit or multiple units at the same time contacting other intelligent devices to notify the customer of the intrusion. Intrusion monitoring may be done via an occupancy sensor or scanning the pool for activity.

More particularly, the controller may control one or more of the following functions: conversion, regulation and storage of the power produced by the generator; receive and process signals from a photo cell detector for activation of an illumination system; receive and process signals from a motion detection system in monitoring or security mode (hybrid models); interface with other intelligent devices such as smart phones with wireless technology such as Bluetooth®, for example, to transmit data or activate other components of the system; and conversion, regulation, distribution of electrical signals to the illumination circuit to control the duration, intensity, color and pattern of the illumination system.

The controller may control the amount of storage in the storage cell for future usage, for example, so that the storage cell is not overcharged or undercharged. For example, it may control the storage to permit operation of the lighting system or a data processing system for a unit specific time period. In a nonlimiting example, the charging circuit of the unit will make use of all power generated until the storage unit (currently batteries) is completely empty. The charging cycle may vary depending on the apparatus and the application in which it is used. Upon user request the device shall transmit to the smart device/docking station the percentage of battery life remaining.

The controller may receive and analyze incoming data and then process this data according to parameters preprogrammed at the factory and/or by the user. The controller may also have another option available such as a radio controlled receiver (Bluetooth® or other smart communication technology) so that the user can select the operation of the unit: such as controlling the hours of operation (overriding the photo cell), light levels, light color and light pattern, chemicals automation system required to correct the water quality to the desired parameters, the amount of heating/cooling required to meet preprogrammed ranges, adjust the speed of the pump system to meet requirements for water turn-over, differential pressure may also be used to monitor the filtration system and automatically regenerate the filtration system to allow the water to maintain its chemical balance at the same time reducing energy consumption.

In another embodiment, the controller can monitor movement in a water feature when it is in or out of operation to guard against intrusion. For example, the user could activate a security mode which would activate high intensity flash circuit in the controller to the lighting system and possibly a high level tone generator (alarm). This would be used to startle the intruders and send a signal back to the user's alarm system that alerts them about the intrusion. The apparatus may be connected to a home alarm system to notify the user of trespass in a water feature by detecting water movements when the pump is running or not running and the user has armed the system.

In general the microprocessor may monitor and/or control any or all aspects of the operation of the apparatus. It may interface with external components for the purpose of control via input/output devices. It can make use of programs that have been written or are written in the future.

In certain embodiments, the apparatus includes a wireless communication device. Wireless communication technology includes any method of communication possible without a direct physical connection between two or more devices, for example, systems based on radio waves. In addition to radio waves, other wireless communication technology can include magnetic (flux), light, or other communication with non-direct device contact either currently known or developed in the future. In certain embodiments, the wireless communication device is a wireless device for exchanging data. This can include Bluetooth® or similar wireless technology. The technology in this area is developing quickly and the apparatus will include any current or future wireless technology.

In certain embodiments, the apparatus includes monitoring/testing devices as described in more detail below. In these embodiments, the apparatus may communicate with smart phones or Bluetooth® devices or other two way communication systems such as SMCS (Smart Mixed-Signal Connectivity™) http://www.smsc.com have developed. The apparatus may utilize current or future technology for communication to the person responsible for water monitoring and maintenance. The apparatus may also be able to communicate with other devices that, for example, adjust the water quality and/or amount of water automatically. The apparatus may include an encryption system for smart phones and other devices to interface with the apparatus in order to protect against unauthorized access.

In certain embodiments, the monitoring portion of the apparatus is capable of operating under parameters which will require input from another smart device such as a smart phone or tablet or like device that is capable of Bluetooth® or similar type of system interface. The user may use a smart application supplied with the apparatus and search a predetermined database for the type of filter, pump used in the system; then upload this data via the smart application so that the apparatus will be able to know the anticipated flow/pressure rates and volumes expected. Another option will be for the user to install the apparatus into the return or suction jet being used and with a freshly cleaned filter and pump working at full capacity activate the learn mode. When the learn mode is activated by the smart interface the apparatus will then know the expected nominal operating range. Once this range has changed by a predetermined percentage or by a user set range the user will be notified via Bluetooth® or similar type of system interface that his filtration system and/or plumbing system is in need of attention to correct the issue causing the system to have deviated from the normal operating range.

In another embodiment, the user of the apparatus may be offered the option of a monitoring service and call center for technical assistance to correct problems that the apparatus has detected. Data collected by the apparatus would be analyzed by the micro-processor and a report would be generated depending on the user's requirements for frequency of reports. These reports would then be transmitted to a base/docking station, which would then contact the user on their Bluetooth® or like device. The base/docking station would be Wi-Fi compatible and IP addressable to allow the user to receive and transmit data from anywhere in the world. The user would have the option to contract the data collection/call center to monitor the current status of the water and devices connected to the water feature. The call center would then contact the user or a predetermined contact for correction of an identified problem.

In another embodiment, the apparatus is able to monitor high and low water levels to then send an alarm to a smart phone or other Bluetooth® or like device for the automatic addition or deletion of water or activation of an alarm system.

The apparatus may be a smart device that can interface with any or all components of a water feature via Bluetooth® and allow the user to interface and control any or all components of the system from anywhere in the world a user has access to the internet or similar such communication system (cellular or like).

Smart phone/tablet applications may be developed to interface with the apparatus. The possibilities are quite endless with programming and possible options with user friendly interface on smart phones/tablet. The apparatus may contain smart technology that will make it possible to interface with multiple units and smart phones/tablets.

In certain embodiments, the apparatus includes one or more monitoring devices or systems for monitoring and/or testing a parameter associated with the fluid. This may include a number of aspects that are properties of the fluid, and/or a number of aspects relating to operation of the environment or application in which the fluid is located. In some embodiments, the apparatus includes a controller, and the controller is adapted for controlling the monitoring device(s).

In the past, water testing and monitoring has been a problem requiring either test strips or expensive instrumentation meters that are externally powered. The present apparatus can be a desirable alternative to these past methods by providing a self-contained testing and monitoring unit that is easily installed. As such, certain embodiments of the apparatus may replace water quality test strips, thermometers, flow meters, water level monitors, filter monitors, and/or complete automation systems currently used to control chemical additives.

The apparatus can include any type of monitoring or testing devices or systems. For example, the apparatus can include different types of probes, sensors, coils or the like for monitoring and/or testing. The apparatus may include input devices such as a photo cell and/or a motion detector. In certain embodiments, power is supplied to a circuit board and microprocessor of the apparatus, which will then power testing probes and/or sensors mounted in or on the housing of the apparatus.

In certain embodiments, the parameter associated with the fluid that is tested and/or monitored by the apparatus includes one or more of the following depending on the model: bacteria, lead, pesticides, nitrate, hydrogen sulfide, total hardness, total alkalinity, total chlorine, free chlorine, chloride, copper, copper ion, silver, potassium monopersulfate, ozone, sulfate, iron, pH, peroxide, total bromine, cyanuric acid, sodium bromide, salt as sodium chloride, total dissolved solids, borates, mass flow, temperature, gallons or liters per minute or hour, luminescent dissolved oxygen, algae, polarographic dissolved oxygen, conductivity, turbidity, water level, chlorophyll a, total dissolved gas, oxidation-reduction potential, photosynthetically active radiation.

The apparatus may monitor and control any or all aspects of water quality. Water quality includes but is not limited to the aspects listed above, including chemistry, flow rate, temperature, water level, etc.

The apparatus may monitor and control parameters related to the operation of the fluid environment, or monitor and control other components in the environment. For example, the apparatus may collect and store data for the manipulation and control of other components of the water feature.

As another nonlimiting example, the monitoring portion of the apparatus may be used to determine if a suction cleaner hose or manual vacuum or any suction point in the body of water becomes restricted.

In some other nonlimiting examples, the apparatus may monitor and control the amount of chemicals required to correct the water quality to the desired parameters, the amount of heating/cooling required to meet preprogrammed ranges, or adjust the speed of the pump system to meet requirements for water turn-over. Differential pressure may also be used to monitor the filtration system and automatically regenerate the filtration system to allow the water to maintain its chemical balance at the same time reducing energy consumption.

In certain embodiments, the apparatus is capable of communicating with other devices as part of the monitoring/controlling function. For example, the apparatus may include a smart phone interface with Bluetooth® or the like for additional programming or monitoring by the user or service personnel or integration into a much larger automation system. The apparatus may communicate with another device that automatically adjusts water quality, amount of water, or another parameter, in view of data from the monitoring of the apparatus.

In a nonlimiting example, the apparatus will be able to monitor high and low water levels and then send an alarm to a smart phone or other Bluetooth® or like device for the automatic addition or deletion of water, activation of an alarm system or emergency shut-down. The apparatus may monitor and interface with water feature components for the purpose of notifying the user of a problem or initiating a corrective measure of such problem when detected by the water monitoring processor.

In certain embodiments, the apparatus can monitor water quality, integrated with an automation system, and has an intelligent device interface so that it can communicate and control parameters related to the functionality of a chemically balanced body of water.

In certain embodiments, the apparatus is capable of monitoring and storing water quality data which can be supplied to the user and or incorporated into an automation system. The apparatus may also be capable of informing the user of corrective measures required and or automatically via Bluetooth® or similar wireless systems for correction.

For example, in certain embodiments, the apparatus is able to notify the user via Bluetooth® or other such method about water quality issues that need to be adjusted and required adjustments such as chemical, filter servicing, level and or flow restrictions. Chemical changes that may be required may employ data/recommendations supplied by the EPA or regulatory body for water quality standards. Level changes high or low water levels due to water loss or water gain. Flow restrictions may be caused but not limited to the filtration system which may have reached maximum storage capacity of particulate or a break in the plumbing or equipment failure. Monitoring shall not be considered simply the examples given above, but may include any and all components of the body of water operation.

In certain embodiments, the apparatus will be able to monitor high and low water levels to then send an alarm to a smart phone or other Bluetooth® or like device for the automatic addition or deletion of water or activation of an alarm system.

Any or all of the above tests or monitoring results can be displayed at a remote docking or display station, holographically on the water, on a smart device via Bluetooth® or similar transmission, on a pendent (portable interface pocket device), or through a smart home data collection system.

In another embodiment, the apparatus includes a feedback controller such as a proportional-integral-derivative controller (PID controller). The feedback controller may be used to interface and control aspects of a water feature or other fluid application requiring human monitoring and intervention. For example, the apparatus may include a feedback controller for the automation for the safety, convenience of water quality control by the owner of the body of water. The information collected may also provide the option to the owner to collect, store, save and download the data via Bluetooth® or other two way communication systems such as SMCS (Smart Mixed-Signal Connectivity™) http://www.smsc.com/ is currently developing for faster lower power consumption of energy for communications. The apparatus can utilize leading edge communications to interface with Smart phones/tablets or other wireless automation systems.

In certain embodiments, the monitoring portion of the apparatus can be capable of operating under two parameters of which both will use input from another smart device such as a smart phone or tablet or like device that is capable of Bluetooth® or similar type of system interface. One option the user may use is a supplied smart application and search a predetermined data base for the type of filter, pump used in the system; then upload this data via the smart application so the apparatus will be able to know the anticipated flow/pressure rates and volumes expected. Another option will be for the user to install the apparatus into the return or suction fluid conduit being used and with a freshly cleaned filter and pump working at full capacity and activate the learn mode. When the learn mode is activated by the smart interface the apparatus will then know the expected nominal operating range. Once this range has changed by a predetermined percentage or by a user set range the user will be notified via Bluetooth® or similar type of system interface that a his or her filtration system and or plumbing system is in need of attention to correct the issue causing the system to have deviated from the normal operating range.

In certain embodiments of the apparatus, the user may be offered the option of a monitoring service and call center for technical assistance to correct problems that the apparatus has detected. For example, data collected by the apparatus would be analyzed by the microprocessor and a report would be generated depending on the user's requirements for frequency of reports. These reports would then be transmitted to a base station, which would then contact the user on their smart phone or like device. The base station would be Wi-Fi compatible and IP addressable to allow the user to receive and transmit data from anywhere in the world. The user would have the option to contact or contract the data collection/call center to monitor the current status of the water and devices connected to the pool/spa or water feature. The call center would then contact the user or a predetermined contact for correction of an identified problem.

In certain embodiments, the apparatus is a self-powered, self-contained unit. The apparatus may include a generator driven by fluid flow, or any other type of generator, which in turn electrically charges a storage cell. The storage cell then utilizes the electrical power stored to drive/operate a micro processor which in turn drives an illumination source and/or interfaces with components that are part of the apparatus or connected mechanically/electrically/wirelessly to the apparatus. The apparatus can be Bluetooth®/wireless capable.

Further, in certain embodiments, the apparatus can be retrofitted to an existing water feature as a self-contained package not requiring any modification to the existing system. The apparatus may be designed as a complete package for use in new or retrofit applications; for example, with the user simply removing an existing return jet in a water feature and replacing it with the apparatus of the invention. There may be no plumbing or electrical requirement changes to the water feature.

In certain embodiments, the in-line apparatus is capable of interfacing with devices such as: pumps, heaters, chlorine generator cells, lighting, ozone generators, UV generators and corona discharge units.

In certain embodiments, the suction/return or in-line apparatus will allow the customer to input the cost per kilowatt hour provided by their local utility provider. This will allow the device to calculate the daily, weekly, monthly and annual cost of operation for their pump and ancillary devices such as heaters, chlorine generators or any electrically operated device attached to the system. There will be an optional smart device offered to be installed at the central electrical supply point or device specific (i.e. pump, lighting) which will be able to communicate with the microprocessor in our apparatus via wireless communication to calculate energy consumption costs. There may also be an optional unit available to be installed in-line with natural gas/propane supply lines to monitor gas flow rates/volume. This information will be provided to the apparatus which will be able to calculate operational costs using rates provided by the utility supplier. Natural gas and propane are typically used for the heating of a pool/spa or other water feature. Since the apparatus has a microprocessor installed all of this information will be easily calculated and complied for use by the customer.

The apparatus may interface with auto-fill devices for water make-up due to losses through, regeneration, evaporation and splash out.

It should be noted that the apparatus may have minimal impact to the flow of the fluid in the fluid conduit.

In certain embodiments, the apparatus is capable of water flow control. Fluid can be diverted via wirelessly or hard wired to flow control valves, check valves or internally restricted with the use of an orifice, aperture or valve incorporated in the apparatus. The purpose of this operation is to allow the user to divert fluid flow to ancillary devices for the purpose of ascetics and/or auxiliary components to improve fluid quality and fluid efficiency.

Referring now to the drawings, there is illustrated in FIG. 1 an embodiment of a powered apparatus 10 according to the invention. It should be recognized that the structure of the apparatus can be modified in a number of ways without departing from the scope of the invention. For example, in the following discussion of the structure and assembly of the apparatus and its positioning in a fluid conduit, it should be recognized that reference to fastening together by threads or the like is a nonlimiting example. The components of the apparatus can be fastened or fitted together in any suitable manner, such as by threading, gluing (use of adhesive), slip fitting or any other method. Also, the apparatus can be positioned in a fluid conduit in any suitable manner.

Figure 5:
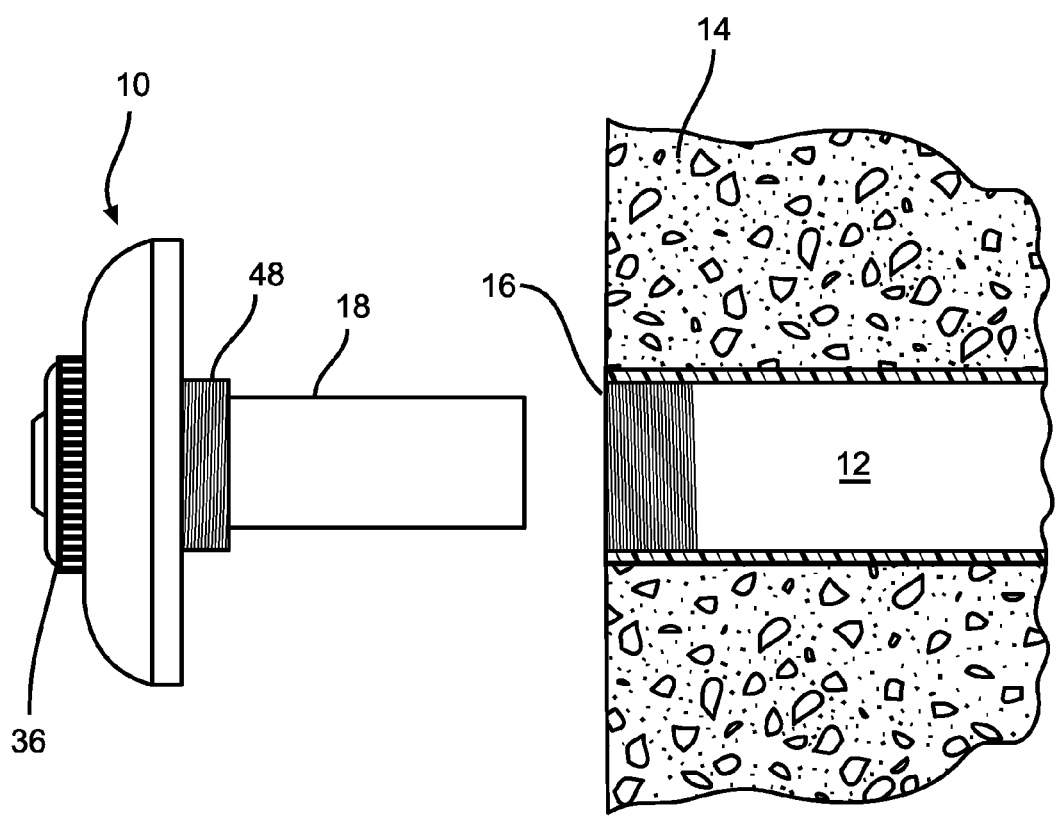
FIG. 5 is a side elevational view, partly in cross-section, showing the apparatus positioned for mounting as a fitting in a return line of a pool.

As shown in FIG. 1, the assembled apparatus 10 has an overall structure for use as a fitting in a fluid conduit of a water feature. FIG. 5 shows the apparatus 10 ready for positioning in a fluid conduit 12 in the wall 14 of a water feature. In the illustrated embodiment, the fluid conduit 12 has internal threads 16 for a purpose described below.

Figure 4:
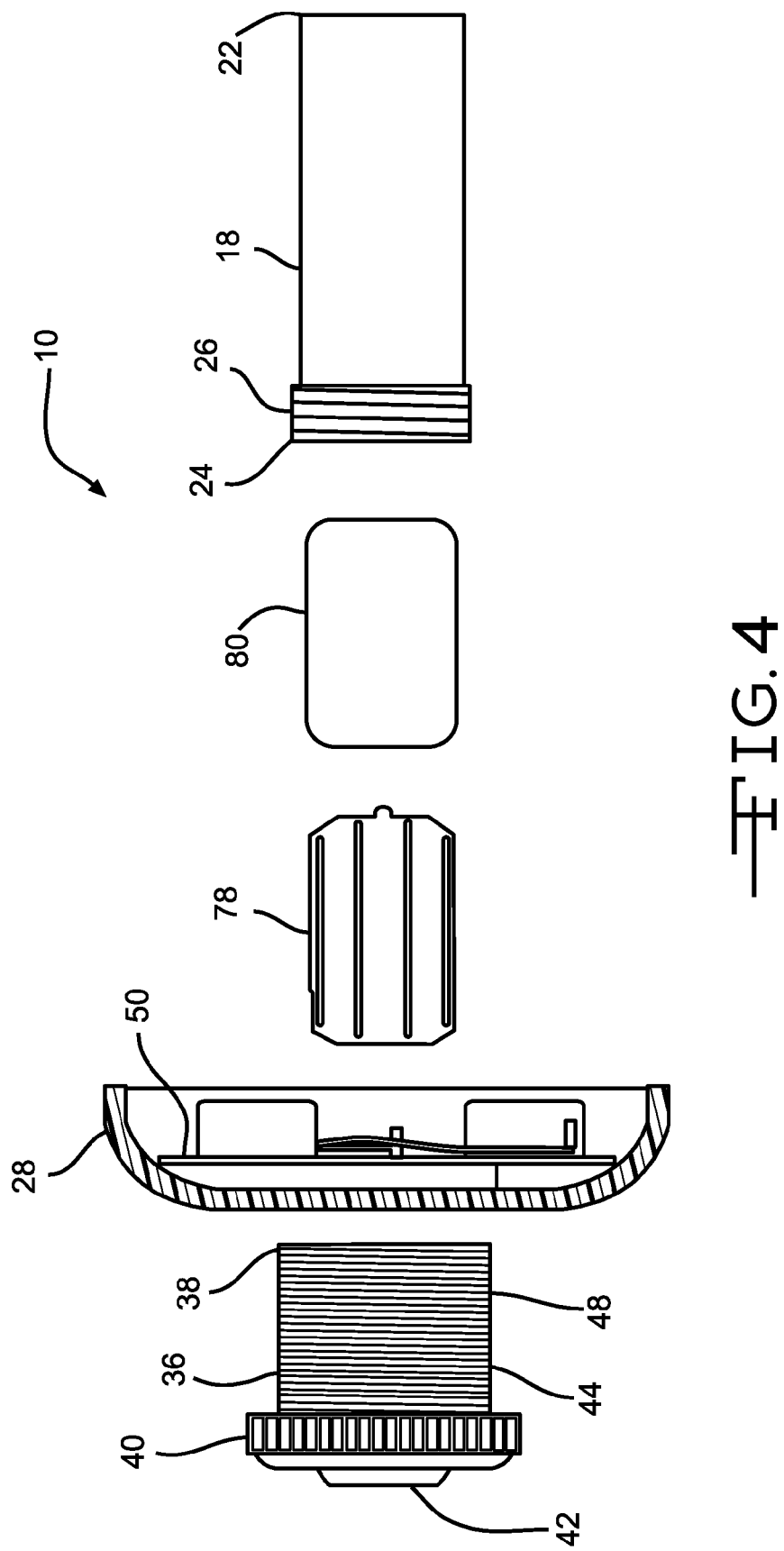
FIG. 4 is an exploded view, partly in cross-section, of the components that make up the apparatus.

As shown in FIGS. 1 and 4, the apparatus 10 includes a component housing 18 that can be positioned inside a fluid conduit. The component housing 18 is generally tubular in shape, including a hollow interior 20, an open inner end 22 and an open outer end 24. In the illustrated embodiment, the component housing 18 includes external threads 26 on the inner end 22 of the housing for a purpose described below.

The component housing 18 can have any suitable configuration and dimensions, which may vary depending on the particular apparatus and the fluid application in which it is used. In certain embodiments, the component housing 18 has a diameter ranging from 0.75 inch to 6 inches and a length ranging from 2 inches to 24 inches. The component housing 18 can be constructed of any suitable material, such as any suitable plastic or metal material.

Figure 3:
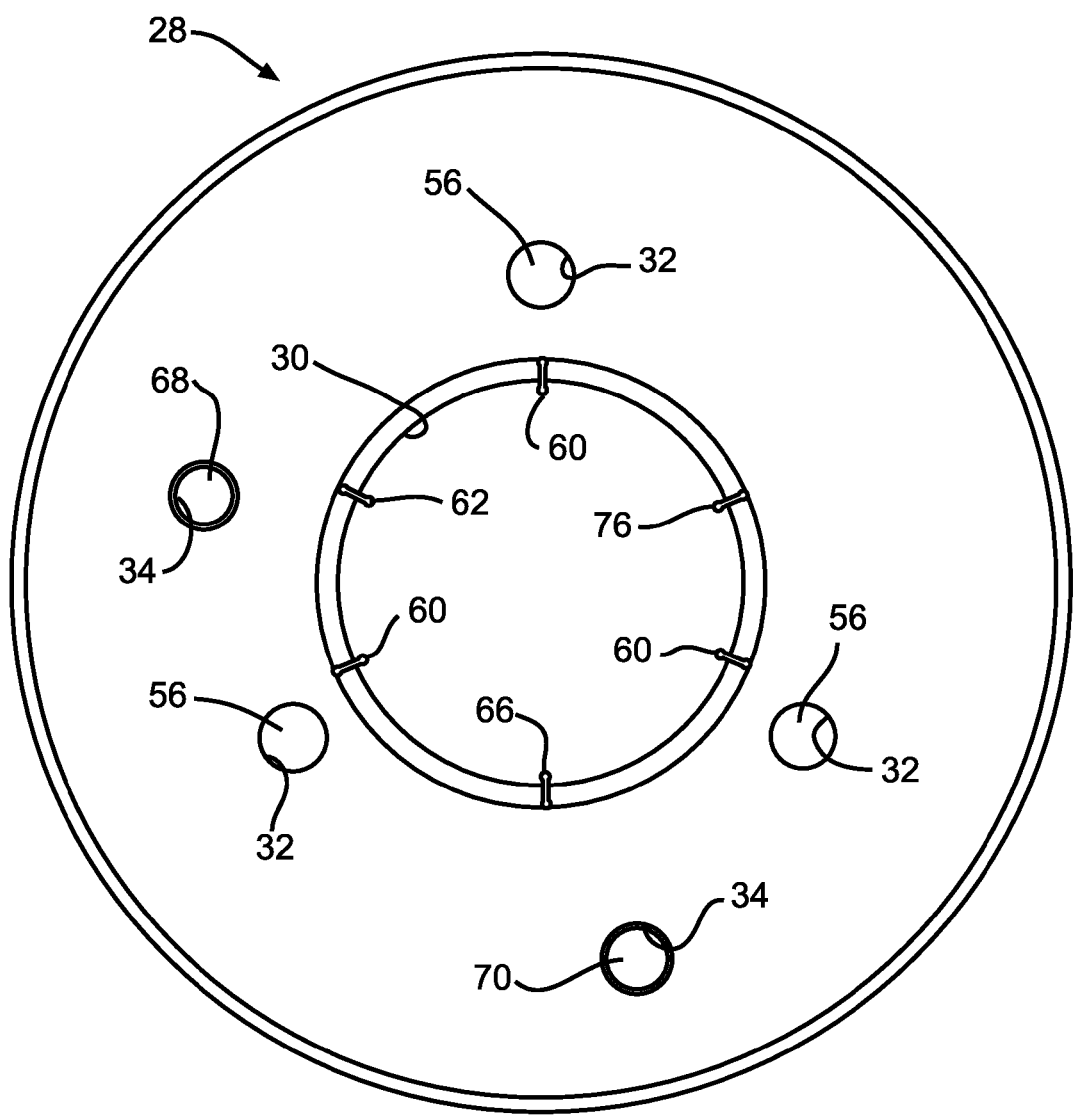
FIG. 3 is a front elevational view of a face plate of the apparatus.

As shown in FIGS. 1, 3 and 4, the apparatus 10 also includes a face plate 28 attached to the outer end 24 of the component housing 18 in a manner described below (or by any suitable method). The face plate 28 is generally shaped as a cupped disc or a shallow bowl. In the embodiment shown, the face plate 28 has a diameter that is enlarged compared to the diameter of the component housing 18. As a result, when the apparatus 10 is positioned as a fitting in a fluid conduit of a water feature, the component housing 18 extends inside the fluid conduit and the face plate 28 abuts the wall of the water feature outside the fluid conduit. The face plate 28 has a relatively large central opening 30 and relatively smaller openings 32 and 34 for purposes which are described below.

Similar to the component housing 18, the face plate 28 can have any suitable configuration and dimensions, which may vary depending on the particular apparatus and the fluid application in which it is used. In certain embodiments, the face plate may have a diameter ranging from 0.75 inch to 16 inches. The face plate 28 can be constructed of any suitable material, such as any suitable plastic or metal material.

As shown in FIGS. 1 and 4, the apparatus 10 also includes an end fitting 36. Like the face plate 28, the end fitting 36 is also attached to the outer end 24 of the component housing 18. The end fitting 36 is generally cup-shaped including a hollow interior and an open inner end 38. In the illustrated embodiment, the end fitting 36 includes an eyeball housing 40 on its outer end. An eyeball 42 is mounted in the eyeball housing 40. As well known in the art, when fluid flows out through the eyeball 42 it forms a fluid jet. This can be any suitable structure for forming a fluid jet, and many different structures for eyeballs and their housings are known in the art. In some embodiments the apparatus does not include an eyeball or other jet forming structure.

The end fitting 36 also includes a hollow cylindrical portion 44 having a diameter somewhat smaller than that of the central opening 30 of the face plate 28, so that the cylindrical portion 44 can fit through the central opening 30 for assembly of the apparatus 10. In some embodiments, the cylindrical portion 44 of the end fitting 36 is a separate piece from the eyeball housing 40 and the two pieces are attached together by any suitable method. In other embodiments, the cylindrical portion 44 and the eyeball housing 40 of the end fitting 36 are not separate but rather are formed integrally. In the illustrated embodiment, the eyeball housing 40 of the end fitting 36 is somewhat larger in diameter than the central opening 30 of the face plate 28. As a result, the eyeball housing 40 of the end fitting 36 abuts the face plate 28 to hold it in place on the apparatus 10 when the apparatus is assembled.

The end fitting 36 includes both internal threads 46 and external threads 48. When the apparatus 10 is assembled, the internal threads 46 on the end fitting 30 are threaded with the external threads 26 on the outer end 24 of the component housing 18 to fasten the end fitting to the component housing. As shown in FIG. 5, the external threads 48 on the end fitting 36 may be threaded with the internal threads 16 of the fluid conduit 12 to attach the apparatus 10 in the fluid conduit. Alternatively, as described above, the apparatus may be attached or mounted in or on the fluid conduit by any suitable means other than by threading.

Figure 2:
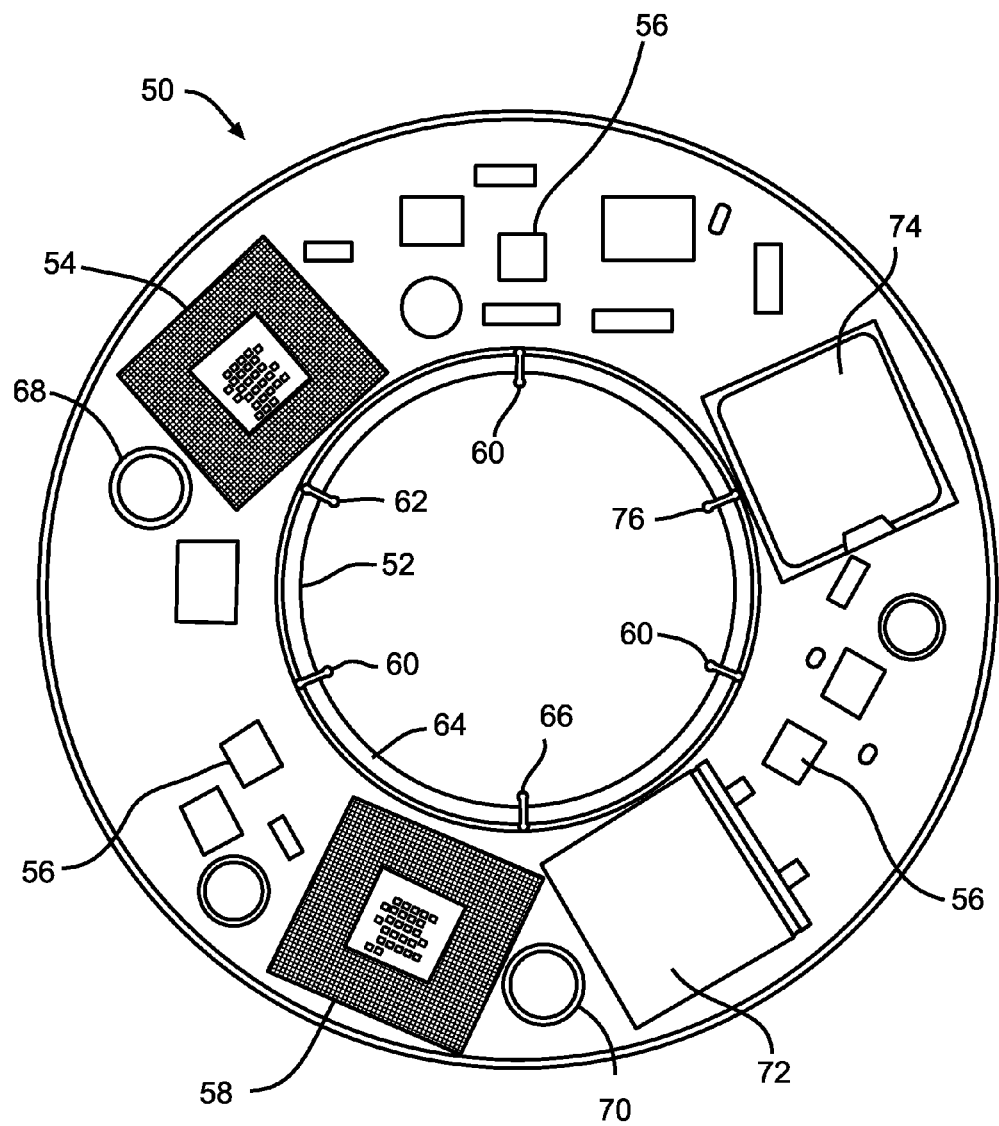
FIG. 2 is a front elevational view of a circuit board of the apparatus with attached electrical components.

As shown in FIGS. 1, 2 and 4, the apparatus 10 also includes a circuit board 50 having a central opening 52. The electronics of the apparatus 10 are mounted on the circuit board 50 and are shown schematically in the drawing. They are briefly mentioned here and described more fully in the earlier part of the description. As shown in FIG. 2, the electronics include a microprocessor and three lights 56 (such as LED or OLED lights). Also included is a water analysis processor 58, three water analysis probes 60, and a water temperature sensor 62. The electronics also include a mass flow meter 64, a water pressure sensor 66, a motion/occupancy detector/scanner 68, an ambient light level detector 70, and a power conditioning cell 72. The electronics further include a wireless communication device 74 and an antenna 76.

As shown in FIGS. 1 and 4, this embodiment of the apparatus 10 includes a generator 78 contained inside the component housing 18 and extending adjacent to the circuit board 50. The generator 78 is electrically connected with the electronics on the circuit board 50. Many different types of generators can be used and are described in more detail in the above description.

As further shown in FIGS. 1 and 4, this embodiment of the apparatus 10 includes an electrical storage cell 80. The storage cell 80 is electrically connected (not shown) with the generator 78. Many different types of storage devices can be used and are described in more detail in the above description.

Figure 6:
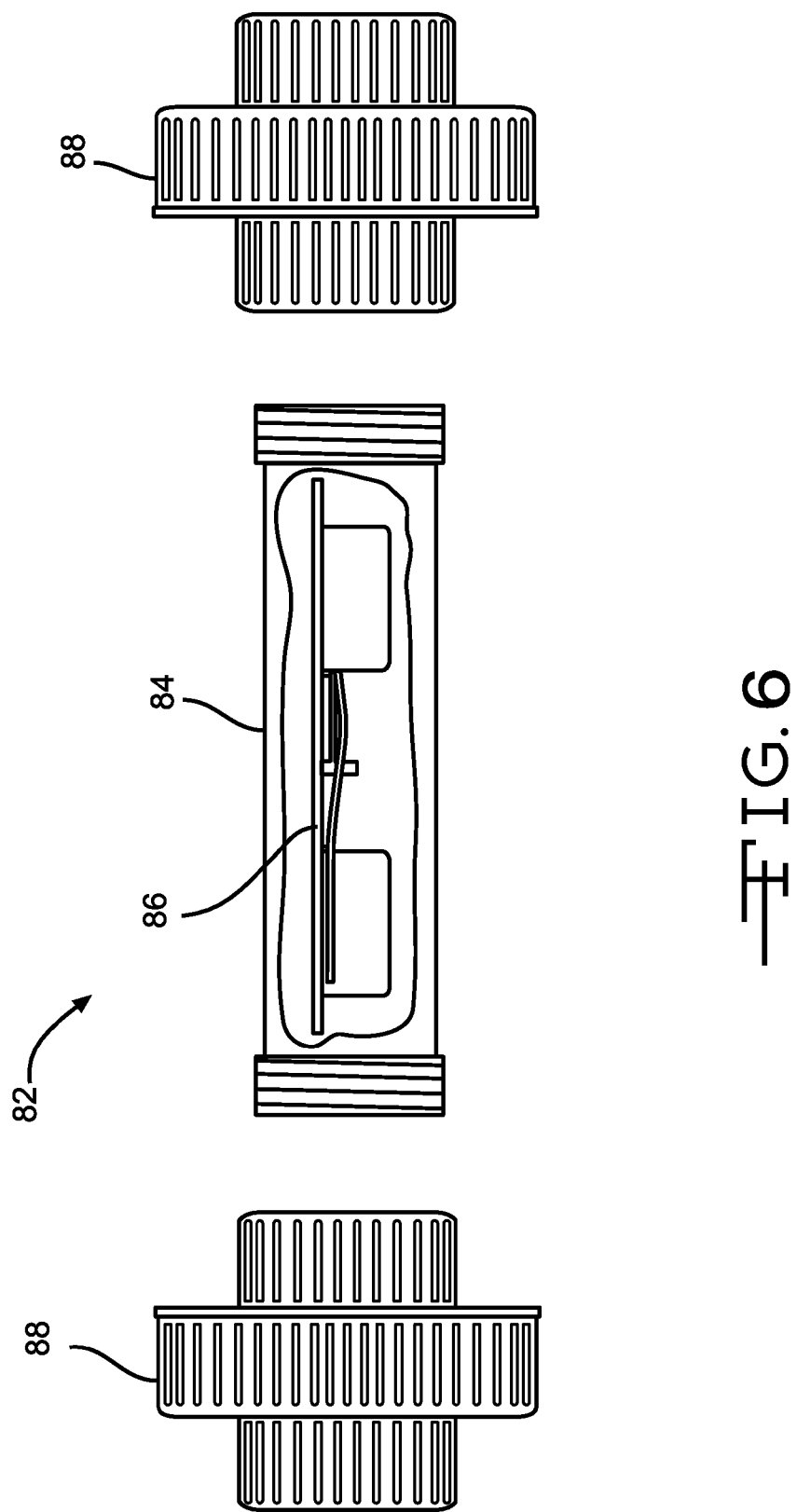
FIG. 6 is an exploded view of an alternate embodiment of the apparatus.

FIG. 6 illustrates an alternate embodiment of an apparatus 82 according to the invention. The apparatus 82 is intended for use as an in-line device; in other words, it can be mounted completely inside a fluid conduit and not have one end extending out of the conduit like in the previous embodiment of the apparatus 10. The apparatus 82 includes a component housing 84 in which can be mounted a circuit board 86 with electronics and other components (not shown) similar to the previous embodiment of the apparatus 10. The apparatus includes fittings 88 for attachment on the ends of the component housing 84. Any suitable fittings 88 can be used, for example the type known as union fittings. The outer diameters of the fittings 88 can abut the wall of the fluid conduit to hold the apparatus 82 in position.

Figure 7:
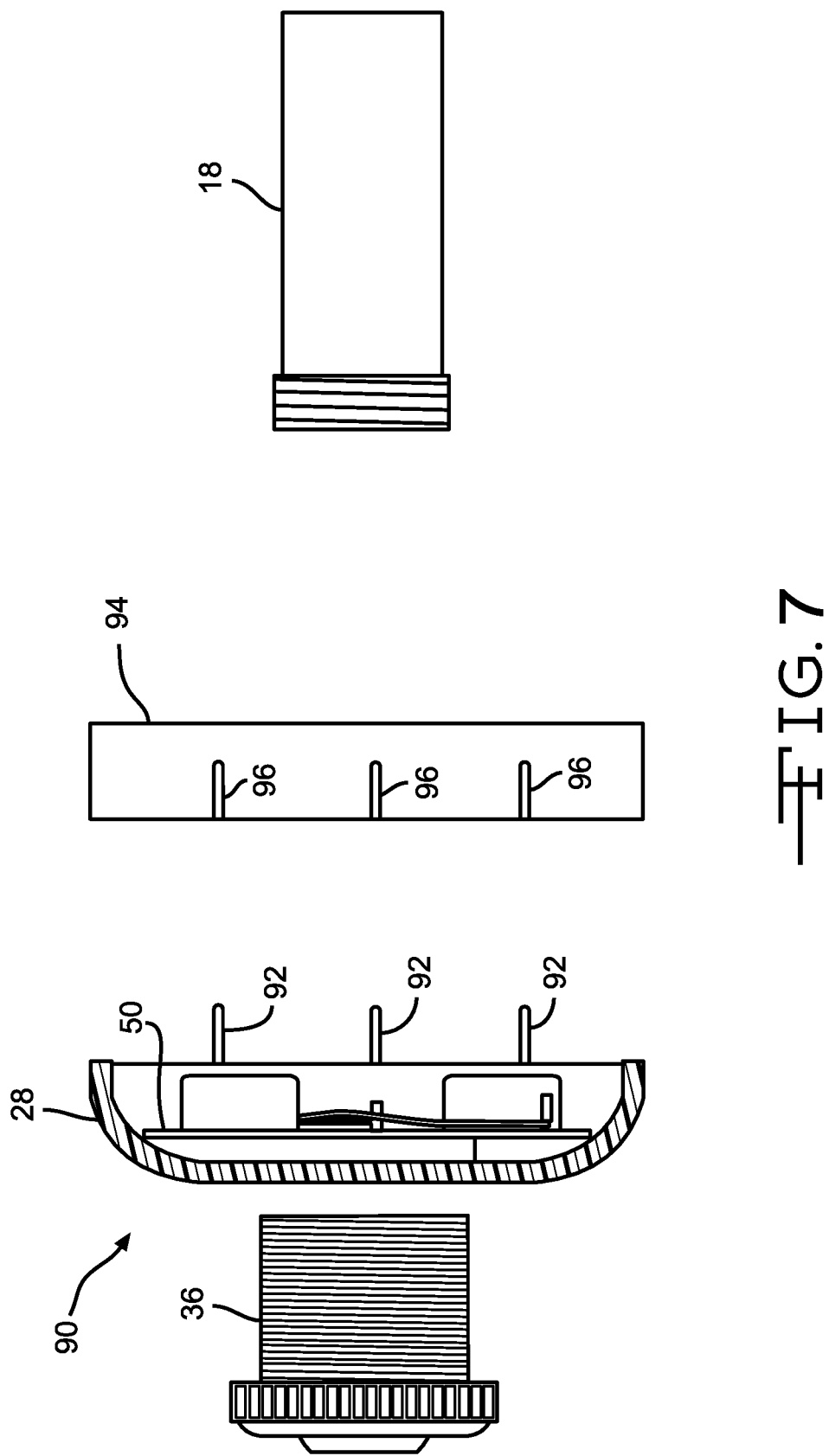
FIG. 7 is an exploded view, partly in cross-section, of another alternate embodiment of the apparatus.

FIGS. 7 and 8 show an embodiment of an apparatus 90 according to the invention that does not include a generator. In this embodiment, the face plate 28 may contain rechargeable batteries (not shown) in addition to the electronics. Several docking pins 92 extend rearward from the face plate 28. The apparatus 90 includes a receiver plate 94 attached to the component housing 18. The receiver plate 94 has openings 96 for receiving the docking pins 92 when the apparatus 90 is assembled together.

When the user wants to recharge the batteries, the face plate 28 can be removed from the receiver plate 94. As shown in FIG. 8, the face plate 28 can then be docked to a charging unit/data transfer unit 98 which may be equipped with a wireless communication device (not shown). The unit 98 has openings 100 for receiving the docking pins 92. The unit 98 may be attached by an electrical cord 102 via an AC adapter 104 to an electrical outlet.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. Control apparatus for controlling the operation of a pool, spa, hot tub or water feature, the control apparatus including:
   at least one monitoring device capable of monitoring a parameter associated with the pool, spa, hot tub or water feature; and
   a powered apparatus associated with a fluid conduit connected to the pool, spa, hot tub or water feature, the fluid conduit having a flow of fluid associated with the pool, spa, hot tub or water feature, the powered apparatus having a controller that can be positioned 1) within the fluid conduit, 2) at the outlet of the fluid conduit, 3) at the inlet of the fluid conduit, or 4) attached to the fluid conduit, the controller being configured to receive data from the at least one monitoring device, the controller being programmable so that it can process data received from the at least one monitoring device, thereby creating processed information, and the controller being configured to wirelessly transmit the processed information to a remote receiving device, wherein the powered apparatus includes a generator that can be positioned within the fluid conduit, the generator configured for generating power from the flow of fluid through the conduit for the operation of at least one electrical device connected to be powered by the generated power.

2. The control apparatus of claim 1 in which the controller is connected to a wireless receiver so that the controller can be directed from a remote location.

3. The control apparatus of a claim 1 in which the controller is configured to control one or more of power storage, wireless communication, and monitoring of a parameter associated with the fluid associated with the pool, spa, hot tub or water feature.

4. The control apparatus of a claim 1 in which the controller is a microprocessor configured to control one or more of a) the quantity or timing of power storage in a battery for the power from the generator, b) wireless communication to and from the controller, and c) the at least one monitoring device capable of monitoring a parameter associated with the pool, spa, hot tub or water feature.

5. The control apparatus of claim 1 in which the at least one electrical device connected to be powered by the generated power is electrical lighting.

6. The control apparatus of claim 1 in which the controller is configured to control the monitoring of a property of the fluid, wherein the property of the fluid is one or more of chemical content, microbial content, temperature, and flow rate.

7. The control apparatus of claim 1 which further comprises a power storage device for storing the generated power, and wherein the controller is configured for controlling the quantity of power storage and timing of power storage.

8. The control apparatus of claim 1 in which the controller is configured to control one or more of the following functions: conversion, regulation and storage of the power produced by the generator.

9. The control apparatus of claim 1 in which the controller is configured to receive and process signals from a photo cell detector for activation of an illumination system.

10. The control apparatus of claim 1 in which the controller is configured to receive and process signals from a motion detection system.

11. The control apparatus of claim 1 in which the controller is configured to control one or more of the conversion, regulation, and distribution of electrical signals to an illumination circuit.

12. The control apparatus of claim 1 in which the controller is configured to control one or more of the duration, intensity, color and pattern of an illumination system.

13. The control apparatus of claim 1 in which the controller is configured to control the hours of operation of the apparatus.

14. The control apparatus of claim 1 in which the controller is configured to control one or more of light levels, light color and light pattern of an illumination system.

15. The control apparatus of claim 1 in which the controller is configured to control a chemicals automation system, including correcting water quality to a desired standard.

16. The control apparatus of claim 1 in which the controller is configured to control heating or cooling of the fluid flowing through the fluid conduit.

17. The control apparatus of claim 1 in which the controller is configured to control the speed of a pump system to meet requirements for water turn-over.

18. The control apparatus of claim 1 in which the controller is configured to maintain a chemical balance of a pool, spa, hot tub or water feature.

19. The control apparatus of claim 1 in which the powered apparatus includes a docking station for recharging or data transfer.

20. The control apparatus of claim 1 including a housing that is dimensioned and configured for mounting the powered apparatus within the fluid conduit, and wherein the housing defines a fluid flow path through the housing, with the generator generating power from the flow of fluid through the housing.

21. The control apparatus of claim 20 wherein the housing includes a generally tubular portion for mounting inside the fluid conduit, and a flange portion at an end of the tubular portion, the flange portion being configured for mounting the housing with respect to the fluid conduit.

22. The control apparatus of claim 1 in which the controller is configured to operate in a learn mode wherein the controller establishes nominal operating ranges for selected parameters associated with the pool, spa, hot tub or water feature.

23. The control apparatus of claim 22 in which the controller is configured to operate by detecting deviations in the established nominal operating ranges for selected parameters, and to send a signal in response to the deviation.

24. Control apparatus for controlling the operation of a pool, spa, hot tub or water feature, the control apparatus including:
   a powered apparatus coupled with a fluid conduit associated with the pool, spa, hot tub or water feature, the fluid conduit being connected with the pool, spa, hot tub or water feature in a manner such that during operation of the pool, spa, hot tub or water feature a flow of fluid passes through the fluid conduit, the powered apparatus having:
   a generator that can be positioned within the fluid conduit, the generator configured for generating power from the flow of fluid through the conduit for the operation of at least one electrical device connected to be powered by the generated power; and
   a controller that can be positioned 1) within the fluid conduit, 2) at the outlet of the fluid conduit, 3) at the inlet of the fluid conduit, or 4) attached to the fluid conduit, the controller being programmable and configured so that it can process data received from the at least one monitoring device, thereby creating processed information, the controller being configured to control the at least one electrical device using the processed data, wherein the controller is a microprocessor.

25. The control apparatus of claim 24 in which the controller is connected to a wireless receiver so that the controller can be directed from a remote location.

26. The control apparatus of a claim 24 in which the microprocessor is configured to control one or more of power storage, wireless communication, and monitoring of a parameter associated with the fluid associated with the pool, spa, hot tub or water feature.

27. The control apparatus of claim 24 in which the at least one electrical device connected to be powered by the generated power is electrical lighting.

28. The control apparatus of claim 24 in which the microprocessor is configured to control the monitoring of a property of the fluid, wherein the property of the fluid is one or more of chemical content, microbial content, temperature, and flow rate.

29. The control apparatus of claim 24 in which the controller is configured to control heating or cooling of the fluid flowing through the fluid conduit.

30. The control apparatus of claim 24 including a housing that is dimensioned and configured for mounting the powered apparatus within the fluid conduit, and wherein the housing defines a fluid flow path through the housing, with the generator generating power from the flow of fluid through the housing.

31. The control apparatus of claim 30 wherein the housing includes a generally tubular portion for mounting inside the fluid conduit, and a flange portion at an end of the tubular portion, the flange portion being configured for mounting the housing with respect to the fluid conduit.

\* \* \* \* \*